June 29, 1926.
E. KOSKI
DIRIGIBLE HEADLIGHT
Filed May 2, 1925
1,590,527
Fig. 1.
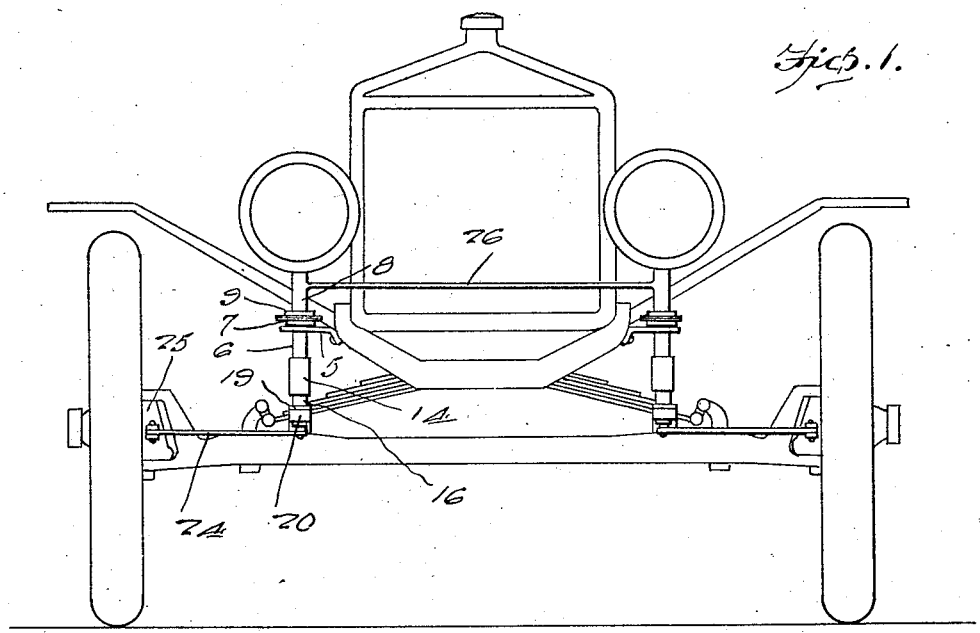
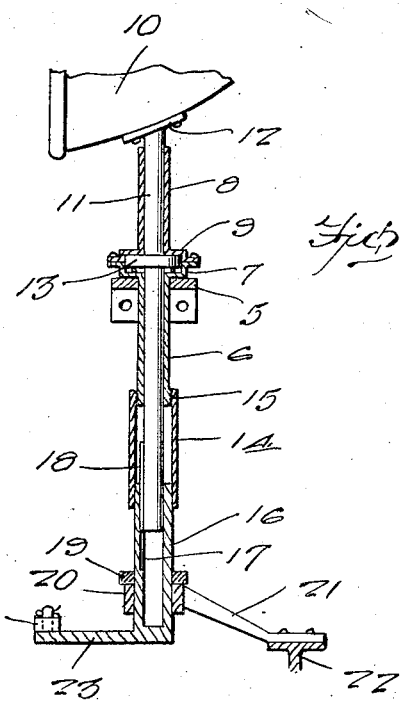
Fig. 2.
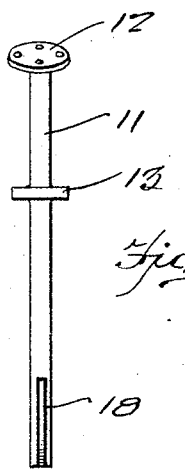
Fig. 3.
Inventor
E. Koski
By
Attorney Patented June 29, 1926.

1,590,527

UNITED STATES PATENT OFFICE.

EDWARD KOSKI, OF BROOKLYN, NEW YORK.

DIRIGIBLE HEADLIGHT.

Application filed May 2, 1925. Serial No. 27,511.

The present invention relates to dirigible headlights for motor vehicles and the like, and the general object of the invention is to provide means for causing the lamp to move with the front wheels of the vehicle, so that the rays of light will be directed upon the road when the vehicle is rounding curves, as well as when moving on straight stretches.

Another important object of the invention is to provide means whereby the movement of the chassis relative to the wheel support axle structure will be compensated for, so as not to affect the headlights.

A still further important object of the invention is to generally improve upon headlight structures of this nature, by providing an exceedingly simple construction, one which is capable of being placed on the market at a relatively low cost, and yet will prove strong, durable and efficient and reliable.

With the above and numerous other objects in view, as will appear as the description proceeds, the invention resides in certain novel features of construction, and in the combination and arrangement of parts as will be hereinafter more fully described and claimed.

In the drawing:

Figure 1 is a front elevation of an automobile showing my dirigible headlight structure mounted thereon.

Figure 2 is a vertical section through one of the headlight supporting devices, and Figure 3 is an elevation of one of the headlight standards.

Referring to the drawing in detail, it will be seen that 5 designates brackets which are attached to the chassis of the automobile in any suitable manner and in any suitable desirable location. Tubular members 6 are formed with enlargements 7 on their upper ends which rest on the brackets 5. Tubular members 8 are provided with enlargements 9 at their lower ends, which are adapted to mate with the enlargements 7 for forming housings. The headlights 10 are provided with depending standards 11 fixed thereto by means of plates 12. Intermediate the ends of the standards 11 there are formed flanges 13. The standards 11 extend rotatably through the tubular members 6 and 8 and the flange 13 is housed within the casing formed by the enlargements 7 and 9. The standard is free to rotate in relation to the tubular members 6 and 8 but is prevented from the casing formed by enlargements 7 and 9 from moving longitudinally. A cylinder 14 is threaded, as at 15, on the lower end of each tubular member 6 and slidably receives a tubular member 16 having an interiorly and longitudinally disposed groove 17 for receiving a longitudinally disposed rib 18 on the lower end of the standard 11.

Collars 19 are provided on the tubular members 16 and these tubular members extend through the ends 20 of brackets 21 supported on the front axle 22, the collars 19 resting on the ends 20. Cranks 23 extend forwardly from the bottom ends of the tubular members 16 and connecting rods 24 connect the ends of the cranks 23 with the spindles 25. A bracket 26 connects the upper tubular members 8.

From the above description, it will be seen that as the front wheels of the vehicles turn, the headlight will be turned therewith, so as to direct the rays of light always in the path of movement of said front wheels. It will further be seen that the tubular members 16 may rotate and slide in relation to the cylinders 14 and therefore the continued movement between the chassis of the automobile and the front axle will be compensated for so as to prevent injury to the headlight.

The construction, operation, and advantages of the invention should now be clearly understood without a more detailed description. It is desired, however, to point out that numerous changes in the details of construction, and in the combination and arrangement of parts may be resorted to, without departing from the spirit or scope of the invention as hereinafter claimed, or sacrificing any of its advantages.

Having thus described my invention, what I claim as new is:

In a structure of the class described, a headlight, a standard depending from the headlight and provided with an annular flange intermediate its ends, a tubular member rotatably receiving the standard and provided with an intermediate portion forming a casing to receive the flange, a cylinder extending from the lower end of the tubular member, a second tubular member rotatable and slidable in the cylinder, a spline connection between the second tubular member and the lower end of the standard, means for rotatably supporting the second tubular member on the axle of a vehicle, a crank extending from the second tubular member, and means connecting the crank with one of the dirigible portions of the vehicle.

In testimony whereof I affix my signature.

EDWARD KOSKI.